Dec. 9, 1952     H. A. ROTHER     2,621,036
VEHICLE SUSPENSION
Filed Aug. 14, 1948     2 SHEETS—SHEET 1
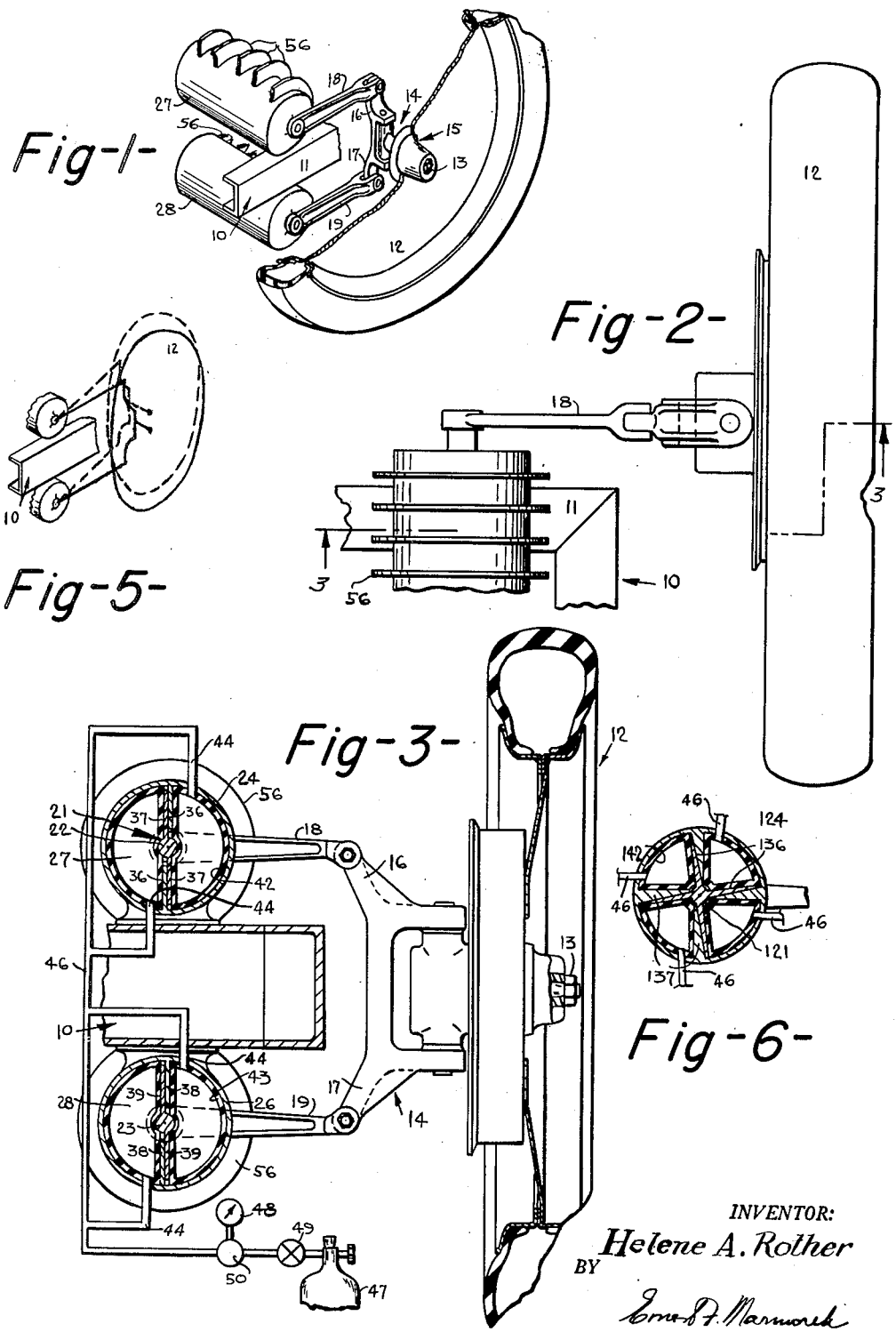
INVENTOR:
Helene A. Rother
BY
her Agent

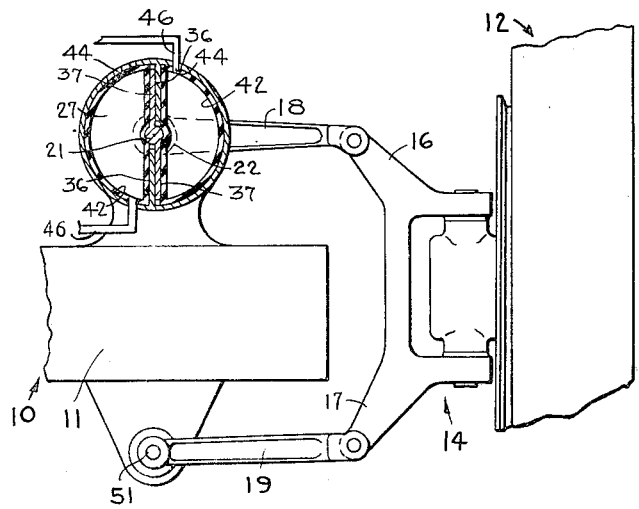
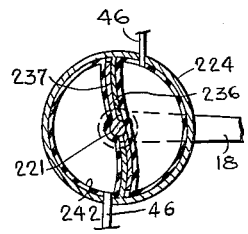
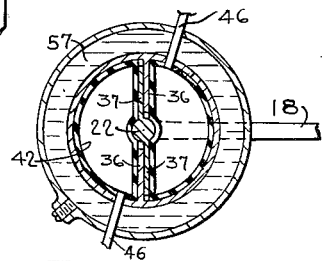
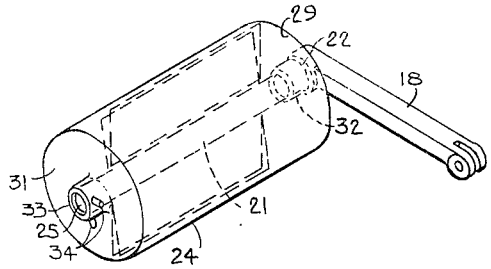
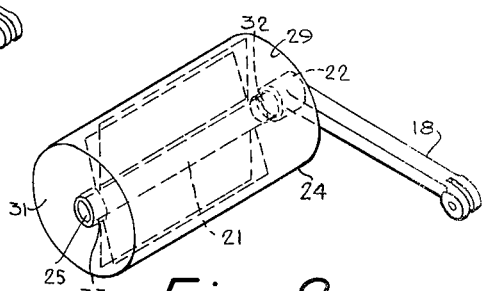
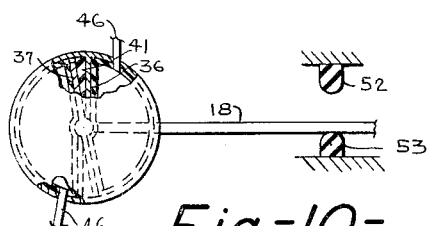
INVENTOR:
Helene A. Rother Patented Dec. 9, 1952

2,621,036

UNITED STATES PATENT OFFICE 2,621,036

VEHICLE SUSPENSION

Helene A. Rother, Detroit, Mich., assignor to INA, Import & Export Company, Detroit, Mich., a firm Application August 14, 1948, Serial No. 44,333

10 Claims. (Cl. 267—15)

The invention relates to vehicle suspension, and relates more particularly to suspension means for the wheels of a vehicle.

One of the principal objects of the invention is to provide for a smooth ride of the vehicle regardless of the vehicle load.

Another object of the invention is the provision of resilient, pneumatically controlled suspension means for the wheels of a vehicle.

A further object of the invention is to provide such suspension means the resiliency of which is adjustable in accordance with the changes of the vehicle load.

A still further object of the invention is the provision of such suspension means that are easy to install, simple to maintain, and which may be produced at low cost.

The invention accordingly comprises the features of construction, combination of elements, and arrangement of parts which will be exemplified in constructions hereinafter set forth and the scope of the application of which will be indicated in the claims.

The foregoing and other objects of the invention will be best understood from the following description of exemplifications thereof, reference being had to the accompanying drawings wherein:

Fig. 1 is a schematic fragmentary perspective view, partly in section, of a wheel suspension, in accordance with the invention;

Fig. 2 is a top view of a similar arrangement as Fig. 1, but showing a modification;

Fig. 3 is a schematic sectional view taken along line 3—3 of Fig. 2;

Fig. 4 is a schematic sectional view similar to Fig. 3, but embodying a further modification;

Fig. 5 is a perspective schematic view showing diagrammatically the load and resilience forces applicable in the vehicle suspension;

Fig. 6 is a fragmentary sectional view of the pneumatic device, similar to that shown in Fig. 3, but embodying a modification;

Fig. 7 is a sectional view similar to Fig. 6, but embodying another modification;

Fig. 8 is a fragmentary perspective view of the pneumatic device shown in Fig. 3;

Fig. 9 is a fragmentary perspective view similar to Fig. 8, but embodying a modification;

Fig. 10 is a fragmentary elevational view, partly in section, of the device shown in Fig. 8, but embodying a further modification; and Fig. 11 is a sectional view similar to Figs. 6, 7, and 10, but disclosing a water jacket with the pneumatic device.

In carrying the invention into effect in the embodiments which have been selected for illustration in the accompanying drawings and for description in this specification, and referring now to Figs. 1–3, there is provided a body 10, including a frame 11, of a vehicle, such as an automobile or the like. A wheel 12 is suspended adjacent the frame 11 of said body 10.

The instant invention will herein be explained in connection with a vehicle having four wheels. Each wheel 12 is suspended relative to the body 10 of the vehicle independently of the other wheels. It will be understood, however, that the invention is equally applicable for suspension of the entire rear end or front end of a vehicle.

Furthermore, since the suspension for each of the four wheels is similar to that of the others, except for right and left side reversal, the description will be limited in the following to a single wheel, it being assumed that said wheel be a front wheel.

The hub 15 of the wheel 12 surrounds a spindle 13, and the spindle 13 is rigidly secured about midway to a spindle support 14 that has an upper end 16 and a lower end 17; the spindle support 14 extends substantially perpendicularly relative to the spindle 13. Conventional means (not shown) may be provided for securing the wheel to the spindle for preventing dislodging thereof from its emplacement thereon.

Two suspension links or arms are pivoted to the ends of said spindle support 14, an upper link 18 being pivoted to the upper end 16 and a lower link 19 being pivoted to the lower end 17 of the spindle support 14. Each of the links 18 and 19 is pivoted with its other end with relation to the body 10 and swingable about the said pivot point with which it is connected relative to the body 10, as will presently be explained.

Said links 18 and 19 are shown, for the purpose of simplicity, substantially parallel and will remain parallel during swinging about the pivot centers of said links. However, the links 18 and 19 may be angularly disposed instead of parallel, either flaring outwardly or inwardly from the body 10 to the wheel 12, as will be understood by those skilled in the art, and the invention is not intended to be limited to the parallel disposal of the links shown in the drawings. Said arms 18 and 19, said spindle support 14 that is pivoted to said arms, and the portion of the body 10 that is located between the two pivot centers of said links, together form a link system that defines the movement of said spindle 13 relative to said body 10, and therefore the movement of said wheel 12 relative to the body. The spindle 13 thus is movable in an arcuate path, for instance upward and downward as best shown in Fig. 5.

In the embodiment shown in Fig. 3, the link 18 is connected to one end 22 of a shaft 21 and the link 19 is connected to one end of a shaft 23. As best shown in Figs. 8 and 9, the connection between the link and the shaft is at one end 22 of the shaft, so that an arc-center is provided for the link, and the end 22 rotates with the link 18 when the latter is tilted about the shaft.

Two drum shaped enclosure structures are provided in the embodiment of Fig. 3, an upper structure 24 and a lower structure 26. Both structures are associated with the body 10, for instance by welding or screwing or otherwise rigidly connecting the structures 24 and 26 to the frame 11 of the body 10. The shaft 21 is located centrally in the cylindrical chamber 27 that is formed by the structure 24, and the shaft 23 is located in the chamber 28 that is formed by the structure 26.

The spindle 13 may either be parallel to the shafts 21 and 23, as shown in Figs. 1 and 5, or at an angle thereto, for instance a right angle, as shown in the remaining views.

Each structure 24 and 26 is provided with end walls 29 and 31 for substantially completely surrounding the cylindrical chamber 27 and 28, respectively. Two bearings 32 and 33 (Fig. 8) are provided on each end wall, one bearing 32 being formed adjacent the end wall 29 and the other bearing 33 formed adjacent the end wall 31.

In the structure 24, the shaft 21 projects with its end 22 beyond the bearing 32 for rigid attachment to the link 18. The other end 25 of the shaft 21 may either be freely rotatable in the bearing 33, as shown in the embodiment of Fig. 8, or it may be fixed, and prevented from rotation by means of splines 34 (not shown in detail), or by other suitable means; this second embodiment is shown in Fig. 9. In both embodiments, however, the end 22 of the shaft 21 is turnable in the bearing 32 in order to follow the rotation brought about by the tilting of the link 18.

In the embodiment shown in Fig. 8, the shaft 21 is revoluble in the two bearings 32 and 33, whereas in the modification shown in Fig. 9 the end 25 of the shaft 21 is prevented from rotation and the end 22 is rotatable but only within the extent of torsional resilience of the shaft 21; that means, the end 22 (Fig. 9) will resiliently resist the tilting movement of the link 18, and the torsional resilience of the shaft 21 will thus urge the link 18 to return to its initial position. The shaft 21, in the embodiment of Fig. 9 constitutes a torsion bar. In both embodiments, however, the shaft end 22 is rotatable.

Torsion bars of the character described herein are well-known to those skilled in this and related arts, and it is therefore believed not necessary to describe these in greater detail. Suffice it to say that they are made of alloyed steel having great torsional resilience and being sufficiently resistant to torsional stress for providing spring return force at the torsionally stressed end.

The shaft of the embodiment shown in Fig. 3 is also stressed torsionally but to a much smaller degree than that of Fig. 9, as will be explained herein below. For the purpose of description herein it will be assumed that the rotatable shaft of the type shown in Fig. 8 is being employed, although it will be understood that the type of Fig. 9 is equally applicable, and reference thereto will be made later on, as this description proceeds.

Two stationary vanes 36 are provided in the chamber 27 and are rigidly secured to the structure 24 and to the end walls 29 and 31 thereof. Said stationary vanes extend substantially radially towards the center portion of the chamber but are spaced from each other for a distance sufficient to provide clearance for the shaft that is located in said center portion. Said vanes 36 are aligned and oppositely disposed.

Two movable vanes 37 are secured in the chamber 27 to the shaft 21 and extend substantially radially therefrom towards the wall of said structure 24 but are spaced therefrom to permit movement of said movable vanes 37. Said movable vanes are movable together with the shaft 21 in opposite rotational directions, and each is normally placed against a stationary vane 36, in rest position.

Similarly, the lower structure 26 is provided with stationary vanes 38 and movable vanes 39 that are rigidly secured in the chamber 28 to the shaft 23.

As best shown in Fig. 10, the movable vanes 37 (39) as well as the stationary vanes 36 (38) may be tapered towards the center of the cylindrical chamber, and cushioning means, for instance a rubber cushion 41, may be provided to arrange for softening the abutment impact between the movable vanes and the stationary vanes in rest position.

A resilient or power means, for instance a pneumatic element including a deformable enclosure 42, is provided between each movable vane 37 and the stationary vane 36 that is substantially oppositely thereto in said chamber 27 (see Fig. 3). Thus the structure 24 has two resilient enclosures 42. Each enclosure 42 is shaped about semi-cylindrically and is formed of rubber, or of similar deformable material, and is filled with a compressed gaseous substance, such as compressed air, and bears against a stationary vane 36, against a movable vane 37 opposite thereto, and against the portion of the cylindrical structure side wall therebetween.

Similarly, the structure 26 has two enclosures 43 filled with compressed gas, such as air.

Each of the enclosures 42 and 43 is provided with an outlet 44, and a gas conduit 46 is connected to said outlets 44 and to a gas source, such as a gas tank 47. Between the gas tank 47 and the outlets 44, the conduit 46 is provided with a pressure control gauge 48, a pressure reduction valve 49 and a pressure control element 50. This pressure control element 50 may be of conventional type and is either operable manually or automatically, or preferably operable by both, for selectively varying the pressure within said enclosures 42 and 43. For manual operation, the handle for this control element, as well as the gauge 48, are preferably located on the dash board of the vehicle (not shown) for easy accessibility by the vehicle operator.

The load of a vehicle is not constant, but depends on the weight carried by the vehicle in addition to its own weight, for instance in a passenger vehicle depends on the number of passengers carried; thus the load of a vehicle is subject to changes and consequently the load portion received by each wheel varies accordingly.

It is often desirable to change the degree of resilience of the wheel springs not only in accordance with the particular load, but also depending upon the condition of the road on which the vehicle travels.

The instant invention permits automatic as well as manual adjustment of the degree of resilience of each wheel with relation to the vehicle body. The resilient enclosures 42 and 43, due to the compressed air therein, urge the movable vanes towards abutment with the stationary vanes, in which rest position the body 10 of the vehicle has a predetermined position relative to the wheels and therefore to the road surface. Should the load increase, the links 18 and 19 as well as the movable vanes 37 and 39 would tend to rotate counter-clockwise (Figs. 3, 4 and 5) against the pressure exerted by the resilient enclosures 42 and 43. Thereupon, additional air will be fed from the tank 47 into the enclosures 42 and 43, under the control of the element 50, for returning the movable vanes to their rest position adjacent the stationary vanes. Conversely, should the load decrease, air will be withdrawn from the resilient enclosures 42 and 43 through the conduit 46.

Furthermore, should a change of resilience be desired, to provide for a smoother ride on a rough road surface, or for other reasons, the resilience may be altered, by manual operation of the control element 50, either by withdrawing air from or pressing additional air from the tank 47 into the resilient enclosures 42 and 43.

In the modification shown in Fig. 4, only the link 18 is secured to a shaft 21, but the link 19 is connected to a revoluble shaft 51 that is journalled in a bearing, such as a rubber bearing, which in turn is connected to the frame 11, to provide a pivot point for said link 19 relative to the body.

As shown in the diagrammatic view of Fig. 5, the load portion of the vehicle at one wheel tends to move the links (18, 19) in a counter-clockwise direction, and the pressure of the resilient elements (42, 43) tends to counteract that pressure by urging the links in a clockwise direction relative to the pivot points thereof located on the body 10.

In order to limit the tilting movement of the links 18 and 19, there are two stops provided near the link 18 and in the tilting path thereof, as best shown in Fig. 10 where the stops have been designated 52 and 53. If desirable, similar stops may be provided for the link 19 in addition to those at the link 18. These stops are secured relative to the body 10 (not shown in detail), and they preferably include a rubber portion for cushioning the impact between the link and the stop. The lower stop 53 is so disposed that the link 18 will abut thereagainst substantially at the instant when the movable vanes are in abutment with the stationary vanes. If desired, the stops may be adjustable to permit adjustment of the abutment positions between the link 18 and the stops 52 and 53.

Where the shaft is held immovable at one end (Fig. 9) and constitutes a torsion bar, the torsional resilience of the bar will aid the resilience exerted by the air-filled enclosures in returning the links to their original position.

Instead of the torsional resilience of the shaft, some other spring device may be used, to boost the vanes and the link in the starting position after the rotating power or load is released. However, where the shaft is revoluble at both ends (Fig. 8), the main spring force will be exerted by the air-filled enclosures, and the torsional resilience of the bar will operate only to soften the pressure of the air-filled enclosures relative to the links.

In the modification shown in Fig. 6, the structure 124 is provided with four stationary vanes 137, and the shaft 121 carries four movable vanes 136. The stationary as well as the movable vanes are offset from each other for a corresponding angular space. Four air-filled enclosures 142 are provided between each movable vane 136 and each stationary vane 137 that is nearest spaced therefrom.

In the modified embodiment illustrated in Fig. 7, the structure 224 is provided on its interior with two opposite and curved stationary vanes 236, and the shaft 221 carries two similarly curved movable vanes 237. Two air-filled enclosures 242 are provided that follow the curved contour of the vanes.

The enclosures 142 and 242 of the modifications shown in Figs. 6 and 7 may again be connected to a source of compressed air and also to facilities for reducing the air pressure, similarly to the preceding embodiments.

Since the cylindrical enclosure structures are subjected to elevated temperatures due to the state of compression of the air in the resilient enclosures, cooling means are provided, for instance cooling fins 56 (Figs. 1 and 2), or a water jacket 57 surrounding the cylindrical enclosure structure (Fig. 11), or similar conventional cooling devices.

The cylindrical structures (27, 28) may be arranged horizontally on the frame 11 as shown in the views, or they may be arranged thereon differently, such as vertically. Also, either one, two or even more cylindrical structures may be employed for each wheel. The more structures are used for each wheel, the softer the ride of the vehicle will be.

The use of the invention has been described only by way of example with the body and wheels of an automobile, but is not limited thereto nor is such restriction intended; it may equally be used for the landing gears of an airplane, or for other devices where resilient suspension is required.

It will be apparent to those skilled in the art that the novel principles of the invention disclosed herein in connection with specific exemplifications thereof will suggest various other modifications and applications of the same. For instance, it may be possible to eliminate one of the links and to operate the independent wheel suspension with a single link secured to a single torsion bar. It may furthermore be possible to provide a sprung suspension of the type herein disclosed for the entire front end or rear end of a vehicle instead of suspending individual wheels.

It is accordingly desired that in construing the breadth of the appended claims they shall not be limited to the specific exemplifications of the invention described herein.

Having thus described the invention, what I claim as new and desire to be secured by Letters Patent, is as follows:

1. In a vehicle including a body and wheels, wheel suspension means comprising, in combination, a spindle adapted to receive a wheel at the hub thereof and to be borne by said wheel, a spindle support secured to said spindle, a link mechanism having a tiltable suspension link pivoted with one end relative to said body and connected with the other end to said spindle support, and resilient revoluble action means including a stationary chamber structure mounted on the body, a stationary partition disposed in the chamber, a second partition rotatable relative to the first, a deformable enclosure for pressurized gas therebetween, and means connecting said second partition to said link for counteracting the pressure of the load portion of said body exerted with relation against said wheel, thereby maintaining said body substantially in predetermined position relative to said wheels.

2. In a vehicle including a body and wheels designed to carry the load of said body, wheel suspension means comprising, in combination, a spindle adapted to receive a wheel at the hub thereof and to be borne by said wheel, a spindle support secured to said spindle, a link mechanism having a tiltable suspension link pivoted with one end relative to said body and connected with the other end to said spindle support, resilient revoluble action means including a stationary chamber structure mounted on the body, a stationary partition disposed in the chamber, a second partition rotatable relative to the first, a deformable enclosure for pressurized gas therebetween, and means connecting said second partition to said link for counteracting the pressure of the load portion of said body exerted with relation against said wheel, thereby maintaining said body substantially in predetermined position relative to said wheels, and adjusting means for said resilient means for varying the resilience thereof substantially in accordance with changes of said load.

3. In a vehicle including a body and wheels, wheel suspension means comprising, in combination, a spindle adapted to receive a wheel at the hub thereof and to be borne by said wheel, a spindle support secured to said spindle and having two opposite ends, a shaft associated with said body and having at least a portion rotatable, two movable suspension links, each pivotally connected with one end to an end of said spindle support and one link pivoted with relation to said body and the other link secured to said portion of said shaft for completing a polygonal link system defining the movement of said spindle relative to said body, and resilient revoluble action means including a stationary chamber structure mounted on the body, a stationary partition disposed in the chamber, a second partition mounted on said shaft in said chamber and being rotatable relative to the first, and a deformable enclosure for pressurized gas therebetween for counteracting the pressure of the load of said body against said wheel, thereby maintaining said body substantially in predetermined position relative to said wheels.

4. Cushioning means, for use in connection with a vehicle including a body, wheels, spindles for said wheels, and independent spindle suspension means, having a link system connected to said spindle for defining the movement of said spindle relative to the body of said vehicle, said cushioning means comprising, in combination, a shaft having at least a portion rotatable and secured to said link system, an enclosure structure surrounding said shaft and being secured to said vehicle, a stationary vane extending on the interior of said structure and secured thereto, a movable vane secured to said shaft portion and movable therewith on the interior of said structure from and towards said stationary vane, and a resilient element in said chamber and in contact with said vanes and adapted to resist movement of said movable vane away from said stationary vane and including a deformable enclosure adapted to receive and to hold a compressed gaseous substance.

5. Cushioning means, for use in connection with a vehicle including a body, wheels, spindles for said wheels, and independent spindle suspension means having a link system connected to said spindle for defining the movement of said spindle relative to the body of said vehicle, said cushioning means comprising, in combination, a rotatable shaft secured to said link system, an enclosure structure surrounding said shaft and being secured to said vehicle, a stationary vane extending on the interior of said structure and secured thereto, a movable vane secured to said shaft and movable therewith on the interior of said structure from and towards said stationary vane, a resilient element in said chamber and in contact with said vanes and including a deformable enclosure adapted to receive and to hold a compressed gaseous substance, said enclosure having an outlet and adapted to receive a gaseous substance of selectively variable state of compression, a gas conduit for connecting said outlet to a source of gaseous substance, and pressure adjusting means for feeding gas to and withdrawing gas from said element, respectively, thereby varying the pressure exerted by said element against said movable vanes.

6. Cushioning means, for use in connection with a vehicle including a body, wheels, spindles for said wheels, and independent spindle suspension means having a link system connected to said spindle for defining the movement of said spindle relative to the body of said vehicle, said cushioning means comprising, in combination, a torsion bar secured with one end to said link system and including a part adapted to be rotated thereby in opposite directions, an enclosure structure surrounding a portion of said torsion bar and being secured to said vehicle, the other end of said torsion bar being rigidly secured to said structure, said torsion bar being resilient and at the same time sufficiently rigid for resiliently resisting rotation of said first end by said link system, a stationary vane extending on the interior of said structure and secured thereto, a movable vane secured to said torsion bar part and movable therewith on the interior of said structure from and towards said stationary vane, and resilient means disposed in said structure and operably connected to said vanes for resisting movement of said movable vane away from said stationary vane, said resilient means adapted to aid the resistance action of said torsion bar for maintaining thereby said body substantially in predetermined position relative to said wheels.

7. In a vehicle, as claimed in claim 1, further characterized in that each partition comprises a plurality of radially disposed curved vanes.

8. In a vehicle, as claimed in claim 1, together with cooling means extending to said chamber structure and operable to draw off heat towards the outside thereof.

9. In a vehicle, as claimed in claim 1, further characterized in that each partition comprises a plurality of angularly offset vanes, and said deformable enclosure comprises a plurality of separate elements each disposed between a vane of the stationary and an adjoining vane of the rotatable partition.

10. In a vehicle including a body and wheels, wheel suspension means comprising, in combination, a spindle adapted to receive a wheel at the hub thereof and to be borne by said wheel, a spindle support secured to said spindle, a link mechanism having an oppositely tiltable suspension link pivoted with one end relative to said body and connected with the other end to said spindle support, and resilient revoluble action means including a stationary chamber structure mounted on the body, a stationary partition disposed in the chamber, a second partition rotatable relative to the first, a deformable enclosure for pressurized gas therebetween, and a torsion bar mounted in said chamber structure and interconnected to said second partition and having two opposite ends, one of said ends of said torsion bar being secured to said suspension link and being rotatable thereby in opposite directions, the other end of said torsion bar being rigidly secured with relation to said body.

HELENE A. ROTHER.

REFERENCES CITED

The following references are of record in the file of this patent:

UNITED STATES PATENTS

| Number | Name | Date |
|---|---|---|
| 2,080,969 | Macbeth | May 18, 1937 |
| 2,115,072 | Hunt et al. | Apr. 26, 1938 |
| 2,148,029 | Matthews | Feb. 21, 1939 |
| 2,176,971 | Klotsch | Oct. 24, 1939 |
| 2,191,211 | Krotz | Feb. 20, 1940 |
| 2,194,964 | Willson | Mar. 26, 1940 |
| 2,208,537 | Brown | July 16, 1940 |
| 2,212,426 | Mistereff | Aug. 20, 1940 |
| 2,226,406 | Krotz | Dec. 24, 1940 |
| 2,226,605 | Geyer et al. | Dec. 31, 1940 |
| 2,270,572 | Woolson et al. | Jan. 20, 1942 |
| 2,303,545 | Graham, Jr. | Dec. 1, 1942 |
| 2,405,458 | Slack et al. | Aug. 6, 1946 |
| 2,477,822 | Probst | Aug. 2, 1949 |

FOREIGN PATENTS

| Number | Country | Date |
|---|---|---|
| 772,052 | France | Aug. 6, 1934 |